United States Patent [19]

MacTavish

[11] 4,285,429
[45] Aug. 25, 1981

[54] TAPE CASSETTE SECURITY CONTAINER

[76] Inventor: William D. MacTavish, 309 Sequoya Dr., Hopkinsville, Ky. 42240

[21] Appl. No.: 118,525

[22] Filed: Feb. 4, 1980

[51] Int. Cl.³ .................... B65D 85/67; A45C 13/10; E05B 65/52
[52] U.S. Cl. .................................. 206/387; 206/1.5; 206/565; 211/40; 312/9; 312/13; 70/63
[58] Field of Search ............... 206/387, 1.5, 316, 565; 211/4, 40; 70/63; 312/9, 12, 13, DIG. 3

[56] References Cited

U.S. PATENT DOCUMENTS

| | | | |
|---|---|---|---|
| 1,358,833 | 11/1920 | Dolman | 312/13 |
| 2,472,486 | 6/1949 | Leninson | 206/1.5 |
| 2,811,251 | 10/1957 | Yerkovich | 206/565 |
| 3,495,716 | 2/1970 | Gregory | 211/40 |
| 3,532,211 | 10/1970 | Gellert | 220/331 |
| 3,828,922 | 8/1974 | Holkestad | 70/63 |
| 4,082,386 | 4/1978 | Beasley | 206/565 |
| 4,245,741 | 1/1981 | Holkestad | 206/387 |

*Primary Examiner*—Herbert F. Ross
*Attorney, Agent, or Firm*—Harrington A. Lackey

[57] ABSTRACT

A tape cassette security container including a housing having an entry opening of slightly lesser dimension than the cassette, a plug member limiting the space within the housing to prevent removal of the cassette, and a key member for removing the plug member to permit removal of the cassette.

8 Claims, 6 Drawing Figures

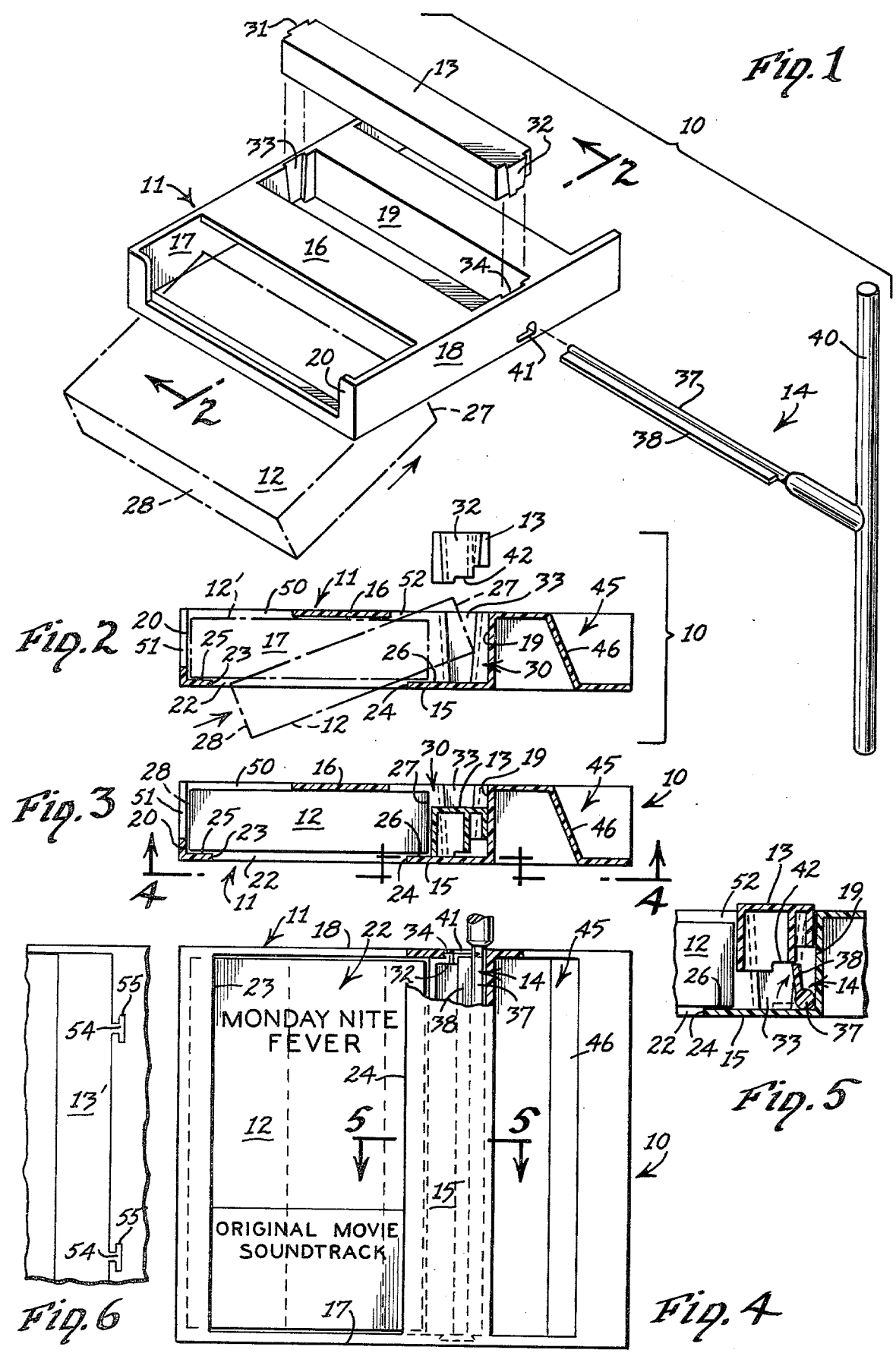

TAPE CASSETTE SECURITY CONTAINER

BACKGROUND OF THE INVENTION

This invention relates to a display package for a small article, and more particularly to a tape cassette security container.

Anti-theft or security packages for small articles, including tape cassettes, are known in the art, such as those disclosed in the following U.S. patents:

U.S. Pat. No. 3,495,716—Gregory—Feb. 17, 1970
U.S. Pat. No. 3,532,211—Gellert—Oct. 6, 1970
U.S. Pat. No. 3,828,922—Holkestad—Aug. 13, 1974
U.S. Pat. No. 3,933,240—Humble—Jan. 20, 1976

Although the above Gregory, Holkestad and Humble patents disclose various types of housings or cases having display openings for receiving a tape cassette, and disclose security devices to prevent unauthorized removal of the tape cassettes from the housings, nevertheless the security of locking elements and keys are quite different from each other.

SUMMARY OF THE INVENTION

It is therefore an object of this invention to provide an anti-theft or security container for a small rectangular article, such as a tape cassette, which includes a security or locking mechanism of novel construction and which is easily and quickly operable.

The security container made in accordance with this invention includes a housing having display openings and an entry opening of slightly lesser transverse dimension than the width of the cassette to be received in the housing. Furthermore, the space within the housing is slightly larger in transverse dimension than the width of the cassette to be received, to permit entry of a plug member, which limits the space within the housing to approximately the size and shape of the cassette received in the housing. The plug member is preferably wedged into its locking space within the housing to prevent removal of the cassette from the housing, even through the entry opening. A special key is provided for removal of the plug member to permit removal of the cassette. This key is normally retained at a checkout station, or with a cashier, to permit removal of the cassette upon purchase.

The particular locking mechanism, including the plug member and special cam key, permits the housing to be used repeatedly for the display of tape cassettes.

BRIEF DESCRIPTION OF THE DRAWINGS

FIG. 1 is an exploded, rear perspective view of the security device made in accordance with this invention, with the key and plug member removed from the housing, and the tape cassette, shown in phantom, entering the housing;

FIG. 2 is a section taken along the line 2—2 of FIG. 1;

FIG. 3 is a sectional view similar to FIG. 2, in which the tape cassette is contained within the housing, and the plug member is in its locking position;

FIG. 4 is a front view, with a portion in section, taken along the line 4—4 of FIG. 3;

FIG. 5 is a slightly enlarged fragmentary section taken along the line 5—5, illustrating the key in its unlocking position, removing the plug member from the housing; and FIG. 6 is a fragmentary rear view of the security device having a modified plug member.

DESCRIPTION OF THE PREFERRED EMBODIMENTS

Referring now to the drawings in more detail, FIG. 1 discloses a security device 10 including a rectangular-shaped container or housing 11 for receiving a rectangular-shaped article, such as an 8-track stereo tape cassette 12. The cassette 12 is contained within the housing 11 by a locking mechanism including a plug member 13 and an especially constructed key member 14.

The rectangular-shaped housing 11 comprises a front wall 15, a rear wall 16, opposed end walls 17 and 18, and first and second opposed side walls 19 and 20.

Formed through the front wall 15 is a large entry opening 22, having a length substantially equal to the longitudinal distance between the end walls 17 and 18, and slightly longer than the length of the tape cassette 12 to be received with the housing 11. The transverse distance between the side walls 19 and 20 is greater than the width of a tape 12 to be received in the housing 11. However, the width of the entry opening 22 is slightly less than the width of the cassette 12. Moreover, the side edges 23 and 24 of the entry opening 22 are spaced from the respective side walls 20 and 19 to provide corresponding ledges 25 and 26 upon which the front wall of the cassette 12 rests in its contained position within the housing 11, as illustrated by the phantom position 12' in FIG. 2 and the solid-line position of the cassette 12 in FIGS. 3, 4 and 5.

As illustrated in FIGS. 1 and 2, the size of the entry opening 22 and the transverse dimension between the side walls 19 and 20 are such that the tape cassette 12 may be inserted widthwise at an angle through the entry opening 22 into the container 11. The leading edge 27 of the cassette 12 enters the opening 22 first and in the direction of the arrow toward the first side wall 19, until the trailing edge 28 has cleared the rear edge 23 of the entry opening 22, as illustrated best in FIG. 2. The trailing edge 28 is then pushed into the space within the container 11 and thrust toward the second side wall 20 until the tape cassette 12 comes to rest in its contained position within the housing 11, resting upon the ledges 25 and 26, as illustrated by the phantom position of the cassette 12' in FIG. 2.

When the cassette 12 is in its contained position, as disclosed in FIG. 3, a locking space 30 remains within the housing 11 between the leading edge 27 and the first side wall 19, into which the locking plug member 13 is adapted to be received, as illustrated in FIG. 3.

The plug member 13 is substantially elongated and rectangular having a width substantially occupying the entire transverse dimension of the locking space 13 between the leading edge 27 and the first side wall 19. On the other hand, the height of the plug member 13 is less than the height of the housing 11 to prevent unauthorized removal of the plug member 13 when it is in its locked The plug member 13 is held in its locked position by a wedging action between it and the end walls 17 and 18 of the housing 11. Such wedging action may be provided by a pair of dove-tail-shaped tongues on opposite ends of the plug member 13 tapering from the rear of the housing toward the front of the housing. These tongues 31 and 32 are adapted to be received in wedging engagement within the corresponding dove-tail slots 33 and 34 in the end walls 17 and 18 of the locking space 30. Thus, when the plug member 13 is fully depressed within the locking space 30, as illustrated in FIG. 3, the tongues 31 and 32 are firmly wedged within their corresponding dove-tail slots 33 and 34, so that it would be extremely difficult for the ordinary shopper or purchaser to remove a plug member 13 in order to remove the cassette 12 from the housing 11.

The key member 14 is constructed to remove the tongue member 13 from the locking space 30. The key member 14 has an elongated cylindrical shank 37, a cam element projecting radially from the shank 37, and a T-shaped handle 40. The key shank 37 and cam element 38 are adapted to be received through a mating slot 41 in the end wall 18, and also adapted to fit against the recessed bottom wall 42 of the plug member 13, having a shape corresponding to that of the key shank 37 and cam element 38 in their lower inoperative position, as disclosed in FIG. 3.

The extension 45 permits the container 11 to have sufficient transverse dimension that it cannot be removed through the hand-hole of a conventional cassette display case. The stiffener wall 46 provides additional reinforcement and strength to the structure of the container 11.

FIG. 6 discloses a modified plug member 13' having a pair of T-shaped projections 54 adapted to be slidably received within corresponding T-shaped slots 55 in the side wall 19 of the container 11. The T-shaped projections 54 and slots 55 are preferably wedge-shaped in height, and function in a similar manner to the dove-tail tongues 31, 32, and dove-tail slots 33, 34, to hold the respective plug members 13' and 13 in their locked positions.

In the operation of the security device 10, and with the key 14 and plug member 13 removed from the housing 11, as disclosed in FIG. 1, the operator inserts a tape cassette 12, leading edge 27 first, through the entry opening 22, as illustrated in FIGS. 1 and 2. After the cassette 12 has been inserted far enough toward the first side wall 19 that the trailing edge 28 clears the edge 23 of the entry opening 22, the cassette 12 is tilted entirely into the housing 11 and then moved transversely toward the second side wall 20 until the front face of the cassette 12 rests against the ledges 25 and 26, as illustrated by the phantom line position 12' of FIG. 2 and the solid line position of FIG. 3. The plug member 13 is then moved forward into the locking space or chamber 30 with the tongues 31 and 32 registering with their respective dove-tail slots 33 and 34. The plug member 30 is urged forward until it is securely wedged in place within the slots 33 and 34 and with the recessed bottom portion 42 surrounding a space for receiving the key shank 37 and cam element 38 in their inoperative position, as disclosed in FIGS. 3 and 4.

The cassette 12 is then locked in its contained position within the housing 11, against unauthorized removal. The housing 11 is then placed in the display rack, not shown.

Most of the surfaces of the cassette 12 may be viewed through the entry opening 22 and also through other display openings 50, 51 and 52. Thus, the labeling on the cassette 12 may be thoroughly read by the potential purchaser so he can make a judgement as to the contents of the tape cassette and his desire to purchase it. If the customer decides to purchase the cassette 12, the housing 11, containing the cassette 12 is taken to the cashier or check-out station for purchase. The cashier or station operator, who has possession of the key 14, inserts the shank 37 through the slot 41 with the cam element 38 registering with the slot 41 and also registering with the recessed bottom portion 42 of the plug member 13. After the key member 14 is fully inserted, as illustrated in FIG. 4, the operator rotates the key handle 40 through 90° in the direction of the arrow in FIG. 5, thereby rotating the shank 37 and the cam element 38 into engagement with the recessed bottom wall 42 to thrust rearward the plug member 13, as illustrated in FIG. 5. After the key member 14 has been fully rotated, the plug member 13 is projected beyond the plane of the rear wall 16, where it can be grasped and easily removed from the locking chamber 30.

The cassette 12 is then removed by first thrusting it laterally toward the first side wall 19 until the trailing edge 28 drops through the entry opening 22 and then pulling the whole cassette 12 through the entry opening 22 away from the housing 11. The tape 12 is then delivered to the purchaser.

A new tape cassette 12 is then inserted into the same housing 11, in the same manner as illustrated before, the plug member 13 replaced, and the housing 11 returned to its mounting on the display rack, not shown.

What is claimed is:

1. A security device for receiving and displaying a cassette, comprising:
   (a) a housing for receiving a cassette having a longitudinal dimension and a transverse dimension,
   (b) said housing having opposed front and rear walls, longitudinally spaced opposed end walls, and transversely spaced opposed first and second side walls,
   (c) an entry opening in said front wall having a length slightly greater than the longitudinal dimension of the cassette to be received in said housing,
   (d) said opening having opposed edges spaced apart widthwise less than the transverse dimension of the cassette to be received in said housing,
   (e) a first ledge between one edge of said opening and said first side wall,
   (f) a second ledge between the opposite edge of said opening and said second side wall,
   (g) said opposed side walls being spaced apart a distance sufficiently greater than the transverse dimension of said cassette to permit the cassette to be inserted widthwise at a transverse angle, leading edge first, through said entry opening toward said first side wall until the trailing edge of the cassette clears said opposite edge of said opening and then can be moved toward said second wall until said cassette rests upon both said first and second ledges in a contained positon within said housing and providing a locking space between said leading edge of the cassette and said first side wall,
   (h) locking means movable into a locking position within the locking space to prevent removal of said cassette from said housing until said locking means is removed from said locking space.

2. The invention according to claim 1 in which said locking means comprises a plug member adapted to be fitted within said locking space, the transverse dimension of said cassette and the transverse dimension of said plug member being not greater than the distance between said side walls, means for retaining said plug member in said locking space, and key means for removing said plug member from said locking space.

3. The invention according to claim 2 in which said means for retaining said plug member in said locking space comprises cooperative wedge means on said plug member and in at least one of said side or end walls.

4. The invention according to claim 3 in which said wedge means comprises a wedge member projecting from one side of said plug member and a cooperative wedge-shaped slot formed in the opposing portion of a wall of said housing.

5. The invention according to claim 4 in which said wedge member is a dove-tail tongue and said cooperative slot is a dove-tail slot.

6. The invention according to claim 2 in which said key member comprises an elongated shank having a cam element adapted to be rotatably received longitudinally of said housing beneath said plug member in said locking space, said plug member being adapted to be forced rearwardly from said locking space by rotation of said key member causing said cam element to engage and thrust said plug member from said locking space.

7. The invention according to claim 6 in which the front-to-rear dimension of said plug member is less than the front-to-rear dimension of said housing.

8. The invention according to claim 1 further comprising additional display openings in at least one other wall of said housing, the dimensions of said display openings being less than the corresponding dimensions of a cassette received in contained position within said housing.

* * * * *